US010621725B2

(12) United States Patent
Fan et al.

(10) Patent No.: US 10,621,725 B2
(45) Date of Patent: Apr. 14, 2020

(54) SMALL OBJECT DETECTION FROM A LARGE IMAGE

(71) Applicant: HERE Global B.V., Eindhoven (NL)

(72) Inventors: Xiaochuan Fan, Chicago, IL (US); Zibo Meng, Columbia, SC (US)

(73) Assignee: HERE Global B.V., Eindhoven (NL)

( * ) Notice: Subject to any disclaimer, the term of this patent is extended or adjusted under 35 U.S.C. 154(b) by 73 days.

(21) Appl. No.: 15/485,704

(22) Filed: Apr. 12, 2017

(65) Prior Publication Data

US 2018/0300880 A1 Oct. 18, 2018

(51) Int. Cl.
*G06K 9/00* (2006.01)
*G06T 7/11* (2017.01)
*G06T 7/73* (2017.01)
*G06K 9/46* (2006.01)

(52) U.S. Cl.
CPC ............ *G06T 7/11* (2017.01); *G06K 9/00818* (2013.01); *G06K 9/4628* (2013.01); *G06T 7/73* (2017.01); *G06T 2207/20084* (2013.01)

(58) Field of Classification Search
CPC .............. G06K 9/00818; G06K 9/4628; G06T 2207/20084; G06T 7/11; G06T 7/73
See application file for complete search history.

(56) References Cited

U.S. PATENT DOCUMENTS

| 9,384,398 | B2 | 7/2016 | Chen et al. |
| 9,404,753 | B2 | 8/2016 | Mays et al. |
| 9,524,541 | B2 | 12/2016 | Heirich et al. |
| 9,530,313 | B2 | 12/2016 | Dannenbring et al. |
| 10,304,193 | B1* | 5/2019 | Wang ................... G06T 7/0012 |
| 2015/0097834 | A1 | 4/2015 | Ma et al. |
| 2017/0147905 | A1* | 5/2017 | Huang .................. G06K 9/6232 |
| 2017/0169313 | A1* | 6/2017 | Choi ..................... G06K 9/6267 |
| 2017/0200063 | A1* | 7/2017 | Nariyambut Murali ..................... G06T 1/20 |
| 2017/0206434 | A1* | 7/2017 | Nariyambut Murali ..................... G06K 9/6256 |
| 2018/0150681 | A1* | 5/2018 | Wang ........................ G06T 7/11 |
| 2018/0300880 | A1* | 10/2018 | Fan ............................ G06T 7/11 |
| 2019/0073553 | A1* | 3/2019 | Yao ............................ G06K 9/46 |
| 2019/0164290 | A1* | 5/2019 | Wang ........................ G06T 7/10 |

OTHER PUBLICATIONS

Cai, Zhaowei, et al. "A unified multi-scale deep convolutional neural network for fast object detection." European conference on computer vision. Springer, Cham, 2016. (Year: 2016).*

(Continued)

*Primary Examiner* — Avinash Yentrapati
(74) *Attorney, Agent, or Firm* — Lempia Summerfield Katz LLC

(57) ABSTRACT

Embodiments include apparatus and methods for training and/or using a convolutional neural network. An image pyramid is calculated from an original image including at least one object of interest. The image pyramid includes a first image under analysis and a second image under analysis. Image patches are calculated at a first predetermined size relative to the first image under analysis and a second plurality of image patches having a second predetermined size relative to the second image under analysis. The convolutional neural network is trained using the image patches and subsequent images are analyzed by the convolutional neural network using similar image patches.

17 Claims, 12 Drawing Sheets

(56) References Cited

OTHER PUBLICATIONS

Reed, Russell. "Pruning algorithms—a survey." IEEE transactions on Neural Networks 4.5 (1993): 740-747.*

Szegedy, Christian, Alexander Toshev, and Dumitru Erhan. "Deep neural networks for object detection." Advances in neural information processing systems. 2013.*

Erhan, Dumitru, et al. "Scalable object detection using deep neural networks." Proceedings of the IEEE Conference on Computer Vision and Pattern Recognition. 2014.

PCT International Search Report and Written Opinion of the International Searching Authority dated Jul. 19, 2018 for corresponding PCT/US2018/026690.

* cited by examiner

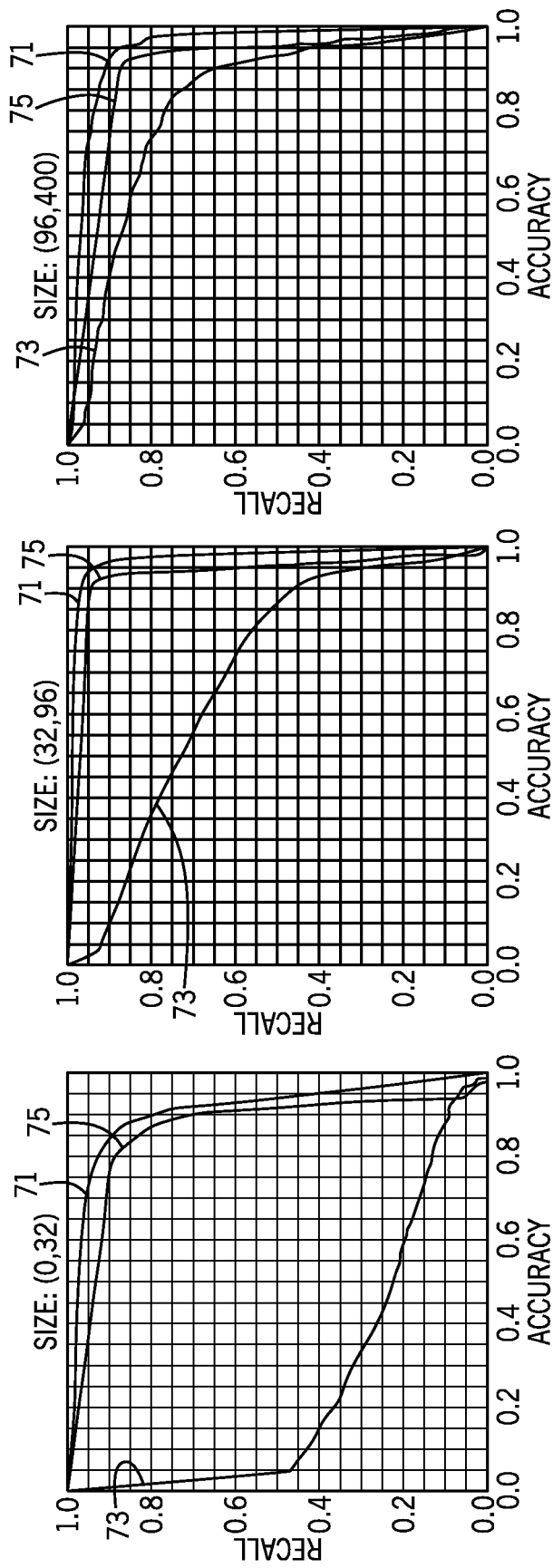

SMALL OBJECT DETECTION FROM A LARGE IMAGE

FIELD

The following disclosure relates to small object detection using a convolutional neural network over a large image, and, in some examples, applying an image pyramid over the large image with image patches or sliding windows at different sizes or resolutions.

BACKGROUND

Object detection is an important task in computer vision for computers to understand the world and make reactions, and has great potential to emerging applications such as automatic driving. In the past few years, deep convolutional neural networks (CNNs) have shown promising results on object detection. Although CNNs have been demonstrated to be effective on object detection, existing methods often do not detect small objects as well as they do for the large objects. Moreover, the size of input for those networks is limited by the amount of memory available on graphics processing unit (GPU). The following embodiments solve these challenges for small object detection with low memory requirements.

SUMMARY

In one embodiment, a method includes identifying an original image including at least one object of interest, calculating an image pyramid from the original image, the image pyramid including a first image under analysis and a second image under analysis, calculating a first plurality of image patches having a first predetermined size relative to the first image under analysis, providing the first plurality of image patches to a convolutional neural network, calculating a second plurality of image patches having a second predetermined size relative to the second image under analysis, providing the second plurality of image patches to the convolutional neural network, receiving first resultant data from the convolutional neural network for the first plurality of image patches, receiving second resultant data from the convolutional neural network for the second plurality of image patches, and providing the first resultant data and the second resultant data using the original image or the original resolution.

In another embodiment a method includes, identifying an original image at an original resolution and including at least one object of interest, wherein the original image is ground truth for the object of interest, calculating a first image patch having a first predetermined size relative to the object of interest and including the object of interest, providing the first image patch to a convolutional neural network, calculating a second image patch having a second predetermined size relative to the object of interest and including the object of interest, providing the second image patch to the convolutional neural network, training the convolutional neural network for the object of interest using the first image patch and the second image patch, calculating coefficient data for a predetermined number of stages based on training the convolutional neural network; and storing the coefficient data for the object of interest.

BRIEF DESCRIPTION OF THE DRAWINGS

Exemplary embodiments of the present invention are described herein with reference to the following drawings.

FIGS. 7(a), 7(b) and 7(c) illustrate recall-accuracy curves for a comparison of small object detection techniques.

DETAILED DESCRIPTION

Figure 1:
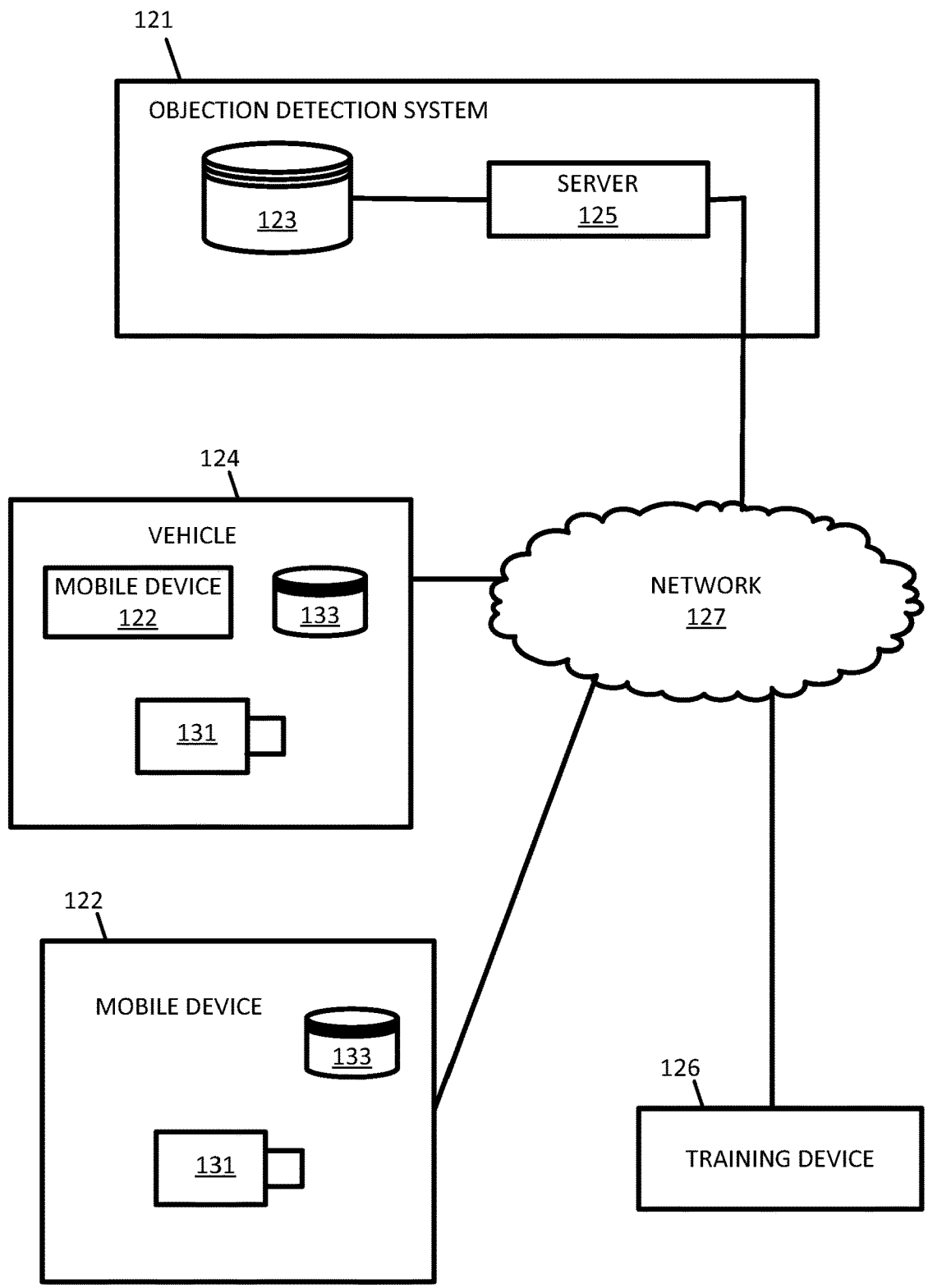
FIG. 1 illustrates an example system for small object detection from a large image.

A neural network includes multiple layers formed of neurons or nodes that are interconnections between the neurons in the different layers of the neural network. The neurons or nodes define a communication path between layers. A neural network may include at least three layers. The first layer has input nodes that send data to the second layer of nodes, and then to the third layer of output nodes. Any number of layers of nodes may be included in the neural network. Each node may be associated with a parameter or coefficient that functions as a weight to manipulate the communication or relationship between nodes. As the neural network is trained, the weights are changed or updated over time. In one example, each path from the input layer to the output layer may define an equation including term coefficients for the weights of the nodes or a matrix including parameters for the weights of the nodes. The equation or the matrix are examples of an activation function for the neural network.

The neural network may include at least data indicative of an interconnection pattern between the different layers of nodes, data indicative of the weights of the interconnections, and data indicative of an activation input. The activation function relates the weights to provides a smooth response as input values change.

A convolutional neural network (CNN) may include multiple layers such as at least one convolutional layer and at least one pooling layer. In addition, at least one non-linear layer may be included. In another example, the CNN may include a predetermined stack of layers such as convolutional layers, pooling layers, rectification layers, one or more fully connected (FC) layers, and a decision layer. The CNN transforms the input data into a highly nonlinear representation. Learned filters activate the image patches related to the recognition task. Neurons in an FC layer have full connections with all activations in the previous layer. Finally, high-level reasoning is done at the decision layer, where the number of outputs is equal to the number of target classes. The score function used by the decision layer is generally the inner product of the activations in the FC layer and the corresponding weights. During CNN training, a loss layer is employed after the decision layer to specify how to penalize the deviations between the predicted and true labels. Different types of loss functions may be employed, such as softmax, support vector machine (SVM), and sigmoid cross entropy.

CNNs have been used for object detection, but existing methods often do not detect small objects as well as they do for the large objects. The size of input for those networks is limited by the amount of memory available on graphics processing unit (GPU).

A VGG-16 is an example CNN with sixteen layers that suffers from these limitations. For example, a model developed from a pre-trained VGG-16 model may bottleneck with a large input (e.g. an image with a size of 2048 by 2048 pixels) and the memory available on GPUs. One way to overcome the aforementioned problem is to increase the stride of the first convolutional layer. The stride of a layer is a number of pixels, or another measure of image distance, that a filter or sliding window associated for the image is incremented. A second possible solution is to downsample the original image to fit the memory. However, the small objects may be even more difficult to be detected.

The following embodiments address the aforementioned challenges for accurate small object detection from large images. In one example, large images have a resolution of over 2000 pixels by 2000 pixels or 4 megapixels. Other definitions for large images may be used. The small objects may be navigation related objects such as road signs. In the following embodiments, a scale invariant image patch approach is applied to the large image in an image pyramid. The large image is broken into multiple set of small patches in different size that are provided to multiple iterations of analysis by a CNN. The results of the multiple iterations may be projected on the original large image or using another technique with the results of the multiple iterations presented at the same scale. As an alternative to a CNN, in one example, another type of hierarchical multi-layered model is used, and in another example, another type of machine learning system is used.

FIG. 1 illustrates an example system for small object detection from a large image. In FIG. 1, one or more vehicles 124 and/or one or more mobile devices 122 are connected to an object detection system 121 though the network 127. The vehicles 124 may be directly connected to the server 125 or through an associated mobile device 122. The object detection system 121, including a server 125 and a database 123, exchanges (e.g., receives and sends) data from the vehicles 124 and/or mobile devices 122. The mobile devices 122 include local databases 133, which may be modified according to the server 125 and may include a subset of the data of database 123. The mobile device 122 may be standalone device such as smartphones or devices integrated with vehicles. The following embodiments may alternatively be performed by the mobile device 122. Additional, different, or fewer components may be included.

The object detection system 121 may include a CNN implemented by server 125. The object detection system 121 may analyze images collected by the one or more vehicles 124 or one or more mobile device 122. Any vehicle 124 or mobile device 122 may include an image capture device 131 for generating the images. The image capture device 131 may include a camera, a charge coupled device (CCD), or an optical distancing device. The optical distancing device may be a light detection and ranging (LIDAR) device. The optical distance data produced by the LIDAR device may be a point cloud. The point cloud includes low level features (e.g., dimensions and areas) analyzed similarly to images.

The object detection system 121 analyzes the images according to pixel values. Pixel values may include image characteristics such as colors, brightness, hue, or luminance and may be associated with other non-image data. The object detection system 121 may not individually analyze the various pixel values, but rather provide the various types of pixel values to the convolutional neural network as part of the image file. For example, each pixel may be associated with a set of pixel values provided to the convolutional neural network.

The object detection system 121 (e.g., server 125) may identify an original image at an original resolution and including at least one object of interest. When training the convolutional neural network, the original image may be defined as the image used for ground truth. That is, the original image is an image that includes one or more objects at known locations within the image. The original image may be associated with data indicative of the image location for one or more objects of interest. In one example, the image location includes a first coordinate value and a second coordinate value (e.g., [x, y] or [horizontal value, vertical value]) for a point of the object of interest. The point may be a corner (e.g., top left corner) or a center of the object of interest.

The object detection system 121 receives data indicative of the positive samples or known locations within the image that include objects of interest. In one example, the server 125 may access metadata stored with the image that includes the object location in the image. In another example, a user may provide the image location by selecting the image locations for one or more objects in the image. In another example, image locations may be determined through crowd sourcing, which may involve sending the image to multiple users and requesting selection of the image location.

The image patches for training the convolutional neural network may selected from the original images at positive samples, which are training samples for the convolutional neural network. The training samples may be cropped from the original image and provided to the convolutional neural network for training. All positive objects in the original image included in a patch may be labeled positive after cropping. In addition, to include more background information, a background set of patches containing only background portions of the image (e.g., portions without any objects of interest) are cropped from the original training images for learning the model. The cropping for the background set of patches may be selected randomly. The ratio between the number of background patches and that of the positive patches may be a predetermined ratio. Examples for the predetermined ratio may be 2:1, 3:1, 4:1 or another value.

Figure 2A:
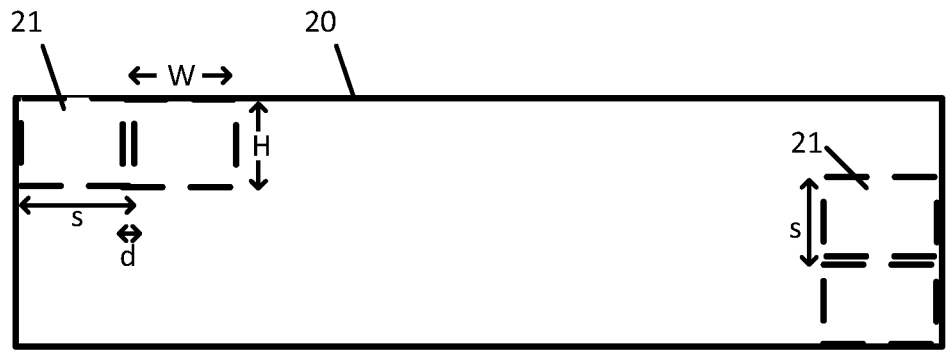
FIGS. 2(a), 2(b), and 2(c) illustrates example image patches for a large image.
Figure 2B:
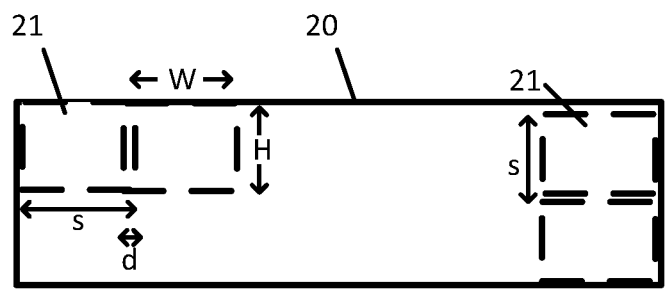
Figure 2C:
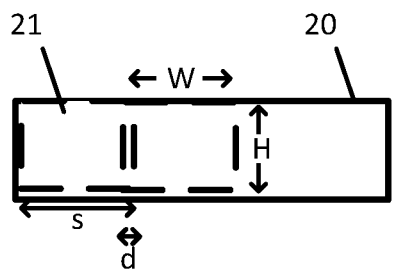

FIGS. 2(a), 2(b), and 2(c) illustrate example image patches 21 for a large image or original image 20. The image patch 21 may be a fixed size having set dimensions (e.g., width W and height H). The image path 21 may be implemented or applied to the original image 20 using a sliding window technique. The sliding window technique may involve defining the image patches 21 by sliding a window of the fixed size across the original image 20 at an interval or stride (s). The stride may be applied in either the horizontal direction, vertical direction, or both. The stride may include a horizontal component and a vertical component that are the same or different. The stride may be the same as the set dimensions of image patch 21 or less that the set dimensions of the image patch 21, as illustrated in FIGS. 2(a)-2(c).

To establish scale invariance, the object detection system 121 (e.g., server 125) analyzes the original image 20 using different relative size between the original image 21 and the image path 21. This may be achieved using an image pyramid using different versions of the original image 21 at different sizes or resolutions. Alternatively, it may be achieved using different sized patches on the original image 21. Across FIGS. 2(a)-2(c) the original image 20 is illustrated in different sizes, which is an image pyramid. The original image 20 may be downsampled to form the image pyramid. The downsampling may be by a downsampling factor (e.g., 0.5 or 2). The ratio of one image in the image pyramid to the subsequent image in the image pyramid may be the downsampling factor. Each level of the image pyramid may be referred to as a different image under analysis. Thus, the object detection system 121 is configured to calculate an image pyramid from the original image 20 including multiple images under analysis (e.g., a first image under analysis and a second image under analysis).

The number of images in an image pyramid may be selected by the user or selected based on one or more factors. The factors may include the size of the original image, the down-sampling ratio chosen, and the stop criterion for down-sampling. In one example, the size of the original images is 2048 pixels×2048 pixels, the down-sampling ratio is 0.5, and down-sampling process is terminated when the size of the down-sampled image is less than 80 pixels×80 pixels. As a result, the image pyramid includes 5 images with different resolutions, i.e. 2048×2048, 1024×1024, 512×512, 256×256, and 128×128, measured in pixels or other distance unit.

FIG. 2(a) has a large size or high resolution, FIG. 2(b) has a medium size or medium resolution, and FIG. 2(c) has a small size or low resolution. Using the image pyramid and an image patch of the same size, a different number of image patches are required to cover the image. Each image patch includes a different amount of subject matter, and as the amount of subject matter in the image patch increases, the relative size of objects in the image patches is smaller.

Figure 3:
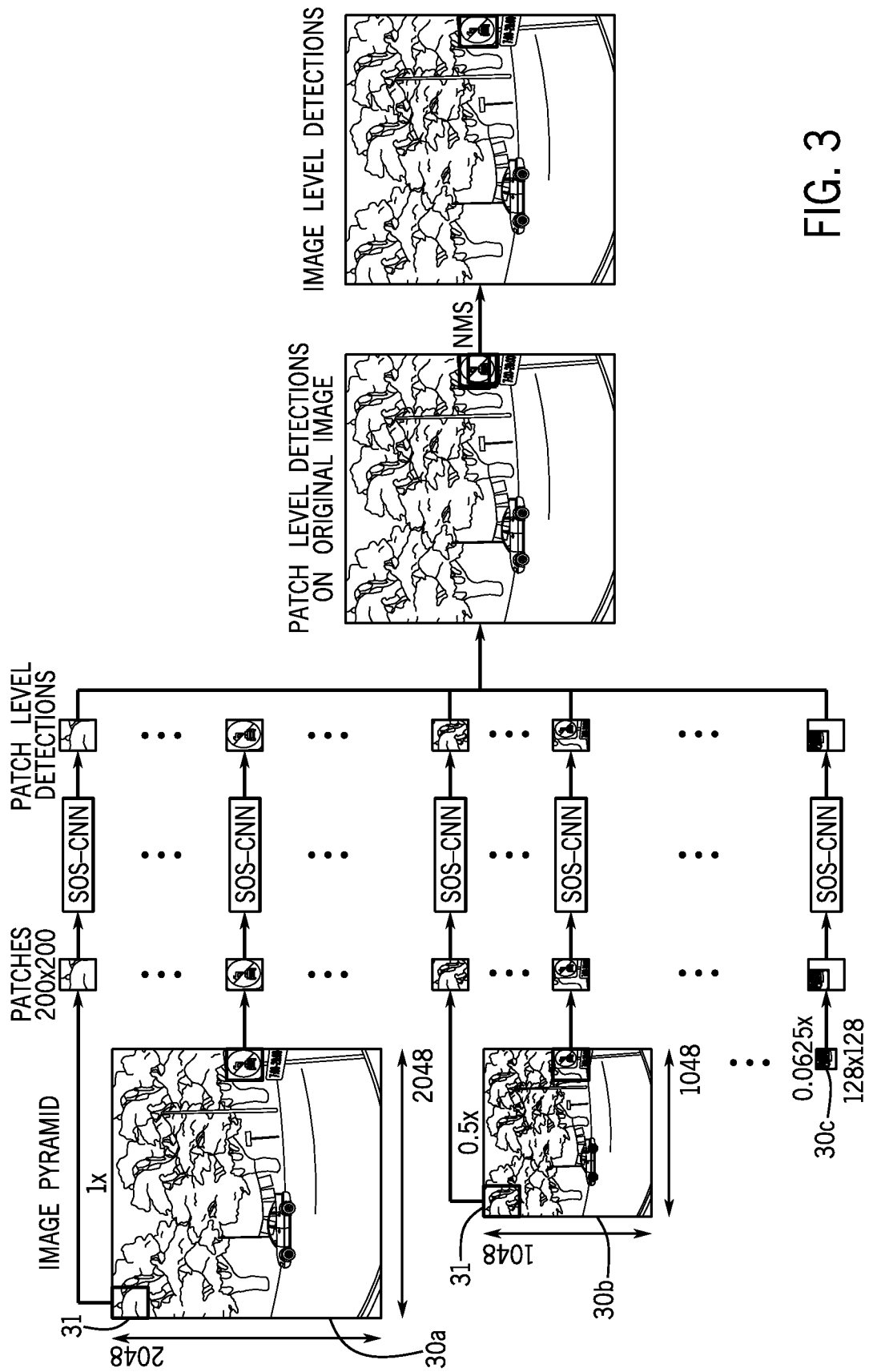
FIG. 3 illustrates an image pyramid applied to a convolutional neural network.

FIG. 3 illustrates an image pyramid applied to a convolutional neural network. As illustrated again in FIG. 3, to reduce memory usage, the original input image is broken into patches with a fixed size using an image pyramid. The image pyramid illustrated includes a first image 30a at a downsampling factor of 1 (e.g., no downsampling) and a resolution of 2048 pixels by 2048 pixels, a second image 30b at a downsampling factor of 0.5 and a resolution of 1024 pixels by 1024 pixels, and a smallest image 30c at a downsampling factor of 0.0625 and a resolution of 128 pixels by 128 pixels. Other levels of the image pyramid, between the second image 30b and the smallest image 30c (e.g., downsampling factors of 0.25 and 0.125).

The image patches are the input to train a Small-Object-Sensitive convolutional neural network (SOS-CNN) or another type of CNN. Using the same number of pixels for the image patch for different images of the image pyramid having different pixel resolutions, the relative size of the image patch compared to the image under analysis changes at different levels of the image pyramid. For an image pyramid having any number of levels, there are at least two images under analysis. The object detection system 121 is configured to calculate a first set of image patches having a first predetermined size relative to the first image under analysis and calculate a second set of image patches having a second predetermined size relative to the second image under analysis.

The object detection system 121 is configured to provide the first set of image patches to a convolutional neural network and provide the second set of image patches to the convolutional neural network. The object detection system 121 trains the convolutional neural network for the object of interest using the first image patch and the second image patch. For example, the location of the object of interest is provided to server 125 as a desired output of the convolutional neural network. Generally, the server 125 iteratively calculates one or more coefficients for the layers of the convolutional neural network. Each coefficient may be stored in association with a particular node or neuron of the convolutional neural network. Each coefficient may be stored in association with the object of interest or multiple objects of interest through the training process.

When using the convolutional neural network, after training, object detection system 121 may receive subsequent images collecting, for example, by mobile device 122 or vehicles 124. The object detection system 121 may identify one of the images as an original image and calculate an image pyramid from the original image. As described above, many different resolutions may be used in the image pyramid, and the image pyramid includes at least a first image under analysis and a second image under analysis. The object detection system 121 calculates a first set of image patches having a first predetermined size relative to the first image under analysis and a second set of image patches to a convolutional neural network.

The first and second sets of image patches are provided to the trained convolutional neural network, which returns first resultant data from the convolutional neural network for the first plurality of image patches and second resultant data from the convolutional neural network for the second plurality of image patches. The first resultant data or the second resultant data may include a category for the at least one object of interest. Categories may include the type of object (e.g., a first type of object may be navigation related objects and a second type of object may be non-navigation related objects). Categories may include a type of navigation related object (e.g., a first type of object may be road signs and a second type of object may be road lanes or borders). Categories may include types of road signs (e.g., a first type of object may be speed signs, a second type of object may be turn restrictions, a third type of object may be road identifiers such as road names, a fourth type of object may identify points of interest, and a fifth type of object may identify destinations).

The object detection system 121 may combine the first and second resultant data on a single feature map. The resultant data may indicate a location for the object within the single feature map. The object detection system 121 may convert the first resultant data to a resolution of the original image and the second resultant data to the resolution of the original image. After conversion, the first resultant data and the converted second resultant data may be combined on the single feature map.

The object detection system 121 may combine the first and second resultant data on the original image, and return data indicative to the first and second resultant data to the mobile device 122 or vehicle 124. In some examples, the original image is augmented to provide a link at the object. The link may describe an attribute of the object (e.g., indicia included on a road sign).

The database 123 may include a map of road segments or road links that are connected at nodes. Each road segment may be stored in association with various characteristics or properties, which are discussed in more detail below, including road characteristic or road property. In some examples, the database 123 may be augmented according to the object of interest to provide an attribute for the road segment associated with the object of interest analyzed by the convolutional neural network. The attribute may indicate the location of a stop sign, the speed limit for the road segment, or another attribute. The link may provide data for a point of interest based on the indicia included on the road sign (e.g., a road sign for a point of interest).

Figure 4:
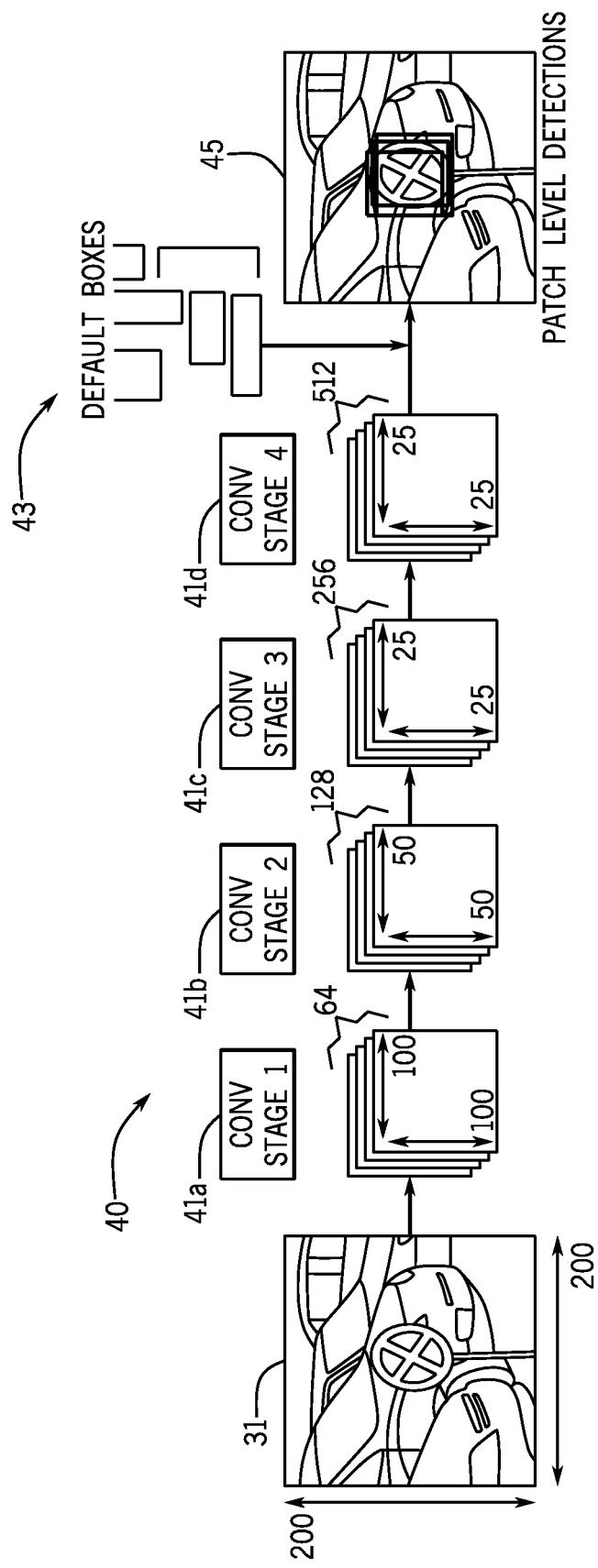
FIG. 4 illustrates an example convolutional neural network.

FIG. 4 illustrates an example convolutional neural network 40 such as a Small-Object-Sensitive convolutional neural network (SOS-CNN). The illustrated SOS-CNN employs a truncated SSD framework using a VGG-16 network as the base network.

The convolutional neural network may use a reduced number of convolutional stages 41a-d. Each convolutional stages may produce a set of feature maps. The example of FIG. 4 illustrates that stage 41a has an output feature map of 100×100, stage 41b has output feature maps of 50×50, stage 41c has output feature maps of 25×25, and 41d has output feature maps of 25×25. Feature maps of stages 41c and 41d have the same size because the down-sampling layer or pooling layer of the fourth convolutional stage is removed. The numbers of the output feature maps of each stage are also illustrated (e.g., 64 for stage 41a, 128 for stage 41b, 256 for stage 41c, and 512 for stage 41d.

The reduced number of convolutional stages 41a-d may be implemented by disabling some stages (e.g., disabling one or more stages in the VGG-16 network). For examples, the stages that are subsequent to the convolutional stages 41a-d may be disabled. Similarly, data may be discarded that results from stages of the convolutional neural network after the predetermined number of convolutional stages.

Alternatively, the reduced number of convolutional stages may be implemented by defining a SOS-CNN have the reduced number of convolutional stages. In one example, the reduced number of convolutional stages is four. A VGG-16 network with five convolutional stages may be reduced to four stages. The fifth stage, or other subsequent stage, in a VGG-16 network may have a receptive field of 224 pixels by 224 pixels, which is larger than many small objects (e.g., larger than sign images in an image of a roadway). Earlier stages may have more moderate receptive field sizes such as 97 pixels by 97 pixels after the fourth convolutional stage. The reduced number of convolutional layers is selected to focus the convolutional neural network on small object detection.

In small object detection, and particularly, in the detection of signs, the object of interest in the image dataset are sparsely distributed. That is, the object of interest occupies a small portion of the image data set. In some examples, the small object of interest may be defined as having less than a predetermined portion of the image or the image dataset. The predetermined portion may be 10%, 1%, 0.1% or another portion. The predetermined portion of the image for signs may be in a predetermined range.

The set of convolutional layers 41a-d may include a kernel or a small matrix. The convolution the process adds each element of the image to its local neighbors, as weighted by the kernel matrix. The size of the kernel should be an odd number. The kernel may be 3×3 as the smallest kernel size that can be used. A 1×1 kernel may be possible, but 1×1 kernels are generally used for dimension reduction.

The kernels are applied to the local region on the feature map to produce confidence scores for each category (e.g., type of sign) as well as the offsets relative to a group of pre-defined default boxes for each location on the top-most feature map. The top-most feature map is the output of the last layer in the set of convolutional layers 41a-d Each category may be associated with a confidence score, and the category with the highest confidence score will be the final prediction. For example, we have two categories, i.e. stop sign and warning sign, and the confidence scores are 6.5 and 2.3, respectively, then the prediction indicates the stop sign because the stop sign has higher confidence score.

The receptive field of this last layer in the set of convolutional layers 41a-d is 97×97. The receptive field in a convolutional neural network refers to the part of the image that is visible to one filter at a time. This receptive field increases linearly as we stack more convolutional layers. Once the layers and the hyper-parameters, e.g. kernel sizes, are fixed, the size of the receptive field is determined as follows: (output_size−1)*stride+kernel_size. For example, we have a CNN have two layers:
Conv1—stride: 4 Kernel_size: 11
Pool1—stride:2 Kernel_size: 3

Fix the output of Pool1 as 1, then the receptive field of Pool1 can be calculated as: (((1−1)*2+3)−1)*4+11=19. Because the sizes of the default boxes are selected as 0.1*200 and 0.2*200, the size of the small objects focused on is around 20~40 of the input image. Thus, a receptive field with a size of 97×97 is adequate for the network to "see" the small objects and, at the meantime, can offer some context information for small object detection.

FIG. 4 also illustrates a set of default boxes 43 and a resultant image 45. The default boxes with different sizes and aspect ratios are introduced at each location of the top-most feature map to assist producing the predictions for bounding boxes. Instead of directly predicting the location of the bounding boxes for each object in an image, for each position of the feature map, the convolutional neural network predicts the offsets relative to each of the default boxes and the corresponding confidence scores over the target classes simultaneously. Specifically, given n default boxes associated with each location on the top-most feature map with a size of w h, there are n*w*h default boxes in total. For each of the default boxes, c classes and 4 offsets relative to the default box location are computed.

As a result, (c+4)*n*w*h predictions are generated for the feature map. The proposed framework uses a single feature map of small scale, while achieving scale-invariance by manipulating scale of inputs, so that the network can focus on learning the discriminative features for small objects while being invariant to scale differences.

To ensure the network focus on detecting the small objects, default boxes with small sizes may be chosen by the server 125. In particular, given the input size of the network (e.g., 200 pixels×200 pixels). The server 125 may calculate the size of the square default boxes are $S_1=0.1*200$, and $S_2=\sqrt{0.1*200*(0.2*200)}$, which means the model focuses on the objects that occupy about 10% of area of the input image. Different aspect ratios may be selected (e.g., aspect ratio (R)={2, 3, ½, ⅓}) to a fit better to objects with a shape other than square. Given the aspect ratio, R, the width $w_R$ and height, $h_R$ of the corresponding default box may be calculated according to Equation 1 and Equation 2:

$$W_R = S_1 \sqrt{R} \qquad \text{Eq. 1}$$

$$H_R = \frac{S_1}{\sqrt{R}} \qquad \text{Eq. 2}$$

As a result, there are 6 default boxes associated with each cell on the top-most feature map of the SOS-CNN with a size of 25 pixels by 25 pixels. Given scores over c classes and 4 offsets relative to each box needed to be computed for each location on the feature map, (c+4)*6*25*25 predictions are generated for each input image.

During the training stage, the correspondence between the default boxes and the ground truth bounding boxes is firstly established. In particular, an overlap (e.g., the Jarccard overlap) between each default box and the ground truth boxes are calculated. The default boxes are considered as matched when the overlap is over a predetermined threshold (e.g., 0.5).

Figure 5:
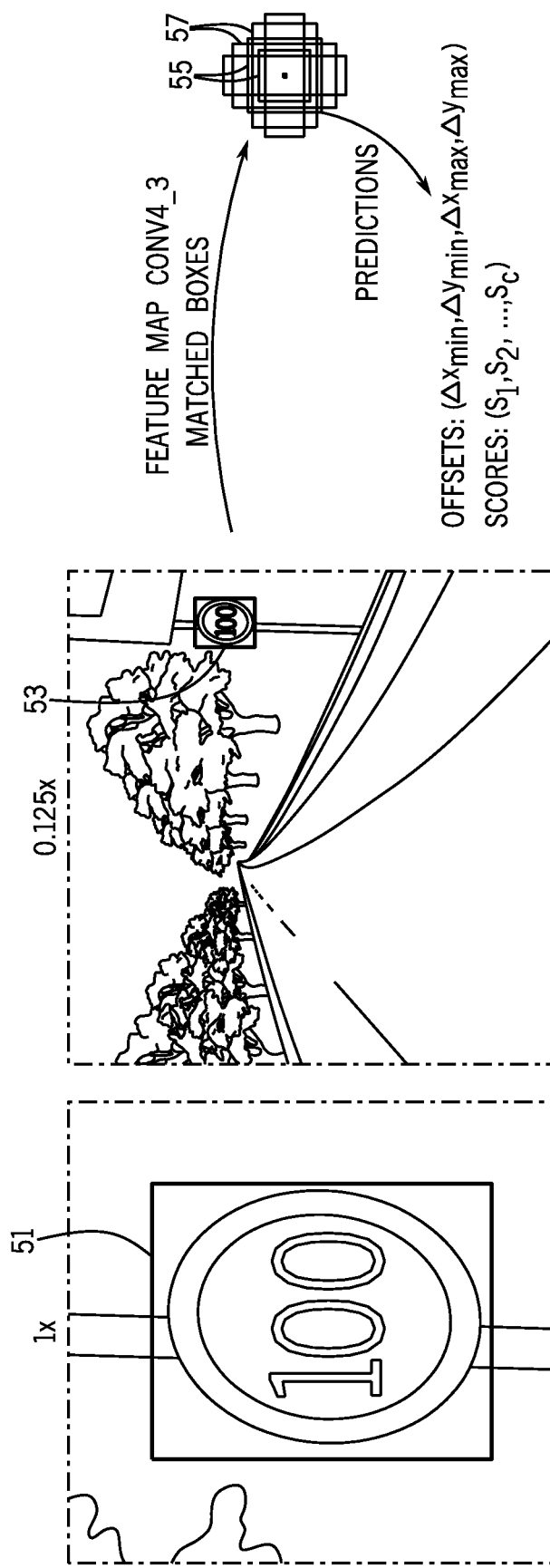
FIGS. 5(a), 5(b), and 5(c) illustrate a matching process during training stage.

FIG. 5 illustrates a matching process during training stage. FIG. 5 illustrates the object of interest with original size is too large to be matched by the default boxes. As illustrated in FIG. 5(a), the solid rectangle 51 indicates the ground truth box, since the default boxes are designed to be sensitive to only objects with small sizes. After being down-sampled 3 times, the objects become matchable in the down-sampled image, as shown by rectangle 53 in FIG. 5(b).

Different default boxes can be matched to one ground truth, as depicted in FIG. 5(c), where the dashed rectangles 55 represent the default boxes matched with the ground truth, while the dashed rectangles 57 give the unmatched boxes. For each of the matched boxes, offsets relative to the box shape and the corresponding confidence scores are calculated, as depicted in FIG. 5(c), which are used to calculate the loss and update the parameters of SOS-CNN.

The example SOS-CNN employs an objective function to minimize localization loss and classification loss according to Equation 3:

$$\text{Loss} = \frac{1}{N}(\mathcal{L}_{conf}(x, y) + \lambda \ \mathcal{L}_{loc}(x, \hat{b}, b)) \quad \text{Eq. 3}$$

where x, y are a matched default box; N is the number of matched default boxes, and $L_{loc}$ is the smooth L1 loss based on the predicted box, $\hat{b}$ and the ground truth bounding box, b; $L_{conf}$ is the softmax loss over target classes; and $\lambda$ is the weight to balance between the two losses, which may be set to 1 empirically.

To make the model more robust to input object shape and location differences, data augmentation may produce training samples by cropping patches from the input images. The overlapped part of the ground truth box will be kept if over a predetermined percentage (e.g., 70 percent) of its area falls in the sampled patch and discarded if less than the predetermined percentage of the area fall in the sampled patch. The sampled patch may be resized to a fixed size (e.g., 200 pixels by 200 pixels), as input for training the SOS-CNN.

Hard negative samples are selected for training according to the confidence scores after each iteration during the training process. In particular, at the end of each training iteration, the miss-classified negative samples will be sorted based on the confidence scores and the ones with the highest confidence scores will be considered as hard negative samples, which are used to update the weights of the network.

As the SOS-CNN is designed to be sensitive to small objects, some large signs in the original image will be missed at the original resolution. An image pyramid is created to cope with the problem. Specifically, as illustrated by the left most column in FIG. 3, given an input image, a smaller image is obtained by sub-sampling the input image by a factor of r along each coordinate direction. The sample procedure is repeated several times until a stop criteria is met. The 200 pixels by 200 pixels patches are cropped from each of the images in the pyramid, which are employed input to the SOS-CNN to produce patch-level detection. Image-level detection can be obtained by utilizing NMS. The image pyramid constructing and patch-cropping process can be done on-the-fly during the testing process.

Figure 6:
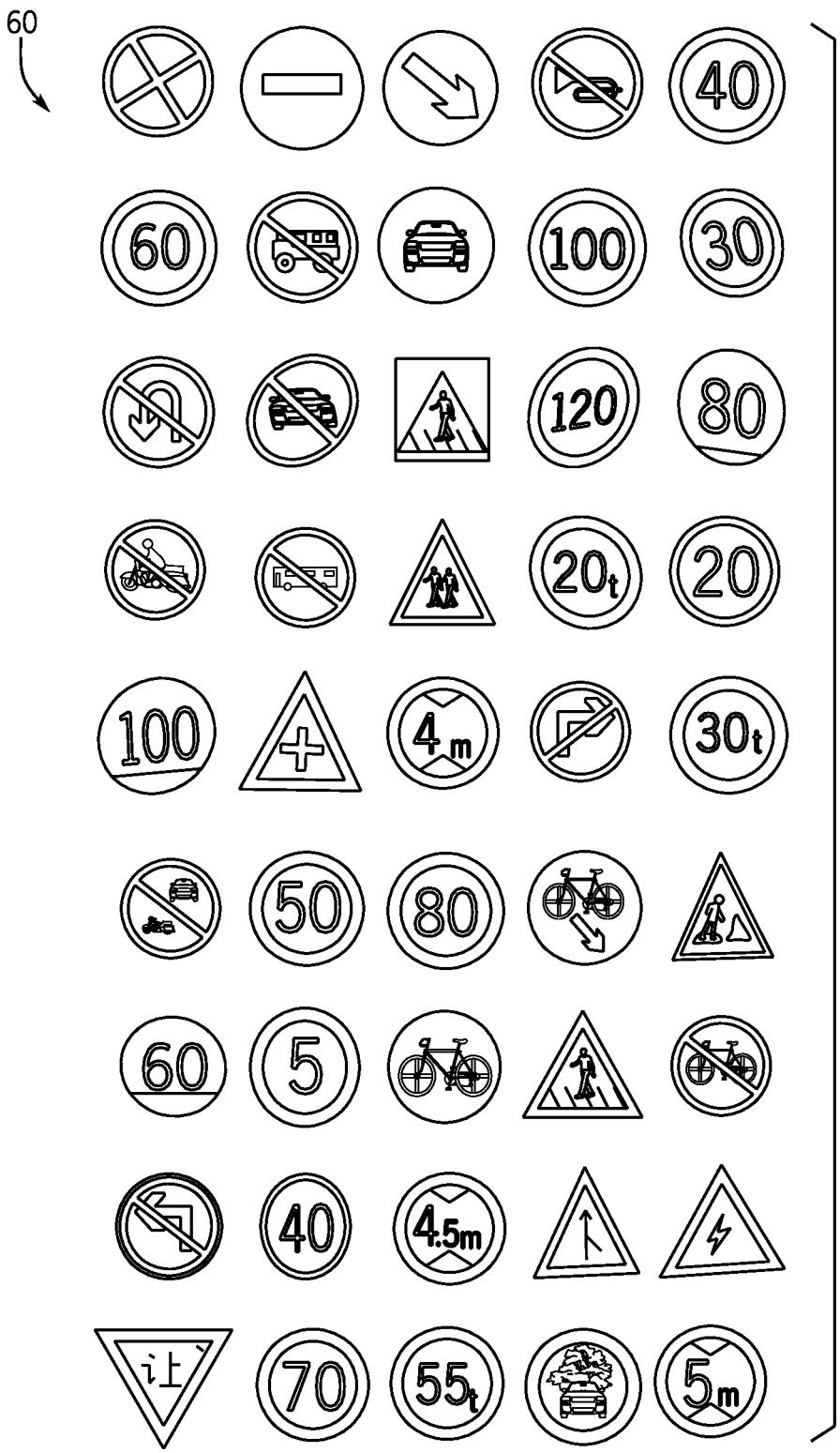
FIG. 6 provides an example set of road signs used to train the convolutional neural network.

FIG. 6 provides an example set of road signs 60 used to train the convolutional neural network. In one example, because it may not be possible to put all the patches from a single image into one testing batch because of the memory limitation on current GPUs, the process may divide the patches from the same image into several batches. All the patch-level predictions are projected back onto the image at the original scale after all the patches from the same image are processed. Then non-maximum suppression (NMS) is employed to generate the final image-level predictions as illustrated in FIG. 3. NMS collects multiple detections overlapped with each other and produce one single prediction by pick the detection with the highest confidence score.

The SOS-CNN is trained by using an initial learning rate of 0.001, which is decreased to 0.0001 after 40,000 iterations, and continued training for another 30,000 iterations. A momentum of 0.9 and a weight decay of 0.0005 are employed. During testing, an image pyramid is constructed with a down-sampling ratio r=0.5, until the area of the down-sampled image falls below 0.4 of 200 pixels by 200 pixels. 200 pixels by 200 pixels patches are cropped from each of the images in the pyramid with a stride of s=180 in both horizontal and vertical directions. The last part in the horizontal direction will be padded zero to 200 pixels by 200 pixels if it does not fit the patch sufficiently (e.g., completely). The last part in the vertical direction gets discarded if it does not make a whole patch.

When evaluating the results, a threshold of 0.5 for the confidence score and an intersection over union (IoU) of 0.5 between the predicted bounding box and ground truth are picked.

The images are collected under real world conditions with large illumination variations and weather differences, and each traffic sign instance generally occupies only a small proportion of an image, e.g. 1%. The database comes with training and testing sets partitioned, while the categorical labels as well as the bounding box associated with each sign are given. The ratio of the numbers of images in training and testing sets is roughly two, which is designed to offer enough variations for training a deep model.

To better demonstrate the effectiveness of the proposed method on small sign detection while maintaining the power for detecting objects with larger sizes, the signs are divided into three different groups according to their areas, i.e. small (Area 2 (0; 322]), medium (Area 2 (322; 962]), and large (Area 2 (962; 4002]). Note that, even signs falling in the large group has relatively small size compared to the size of the original image, i.e. a sign with a size of 400 occupying about 3.8% area of the original image.

FIG. 7 illustrates recall-accuracy curves for two state-of-the-art methods (control 73 and control 75) and the results of the disclosed embodiments (results 71). The curves for control 73 employed VGG CNN M 1024 as the base network, which employs a large stride on the first convolutional layer to be able to process the large images. For the proposed framework, the accuracy-recall curve is obtained under different threshold settings on the predictions with a confidence score above 0.01. The proposed method consistently outperforms the two state-of-the-art methods on signs of different sizes. More importantly, the proposed system outperforms control 73 on the small signs by a large margin, indicating the effectiveness of the proposed method on small sign detection.

FIG. 8 illustrates recall-accuracy curves for a SOS-CNN according to the present embodiments in terms of detecting small signs. On the images with high resolution, i.e. 2048 pixels by 2048 pixels, the detection performance for signs with small sizes, represented by curves 81, is the best compared with that for signs with medium and large sizes. On the images with low resolutions, i.e. less or equal to 512 pixels by 512 pixels, where the originally large signs become detectable by the SOS-CNN, while the originally small signs become invisible to the network, the detection performance for the large signs, illustrated by curves 85, becomes superior to that on the images with high or medium resolutions. Using the patches from only the images with original resolution, i.e. 2048 pixels by pixels 2048, as input to the SOS-CNN without any down-sampling process for testing, corresponding to high resolution shown by curve 81. Using the patches from the image that has been down-sampled once, i.e. 1024 pixels by 1024 pixels, as input without any further resizing, corresponding to medium resolution shown by curve 83. Using the patches from the image that has been downsampled twice, i.e. 512 pixels by 512 pixels, and those from the images that have been down-sampled until the stop criterion are met, corresponding to low resolution shown by curve 85.

Figures 8A, 8B, 8C:
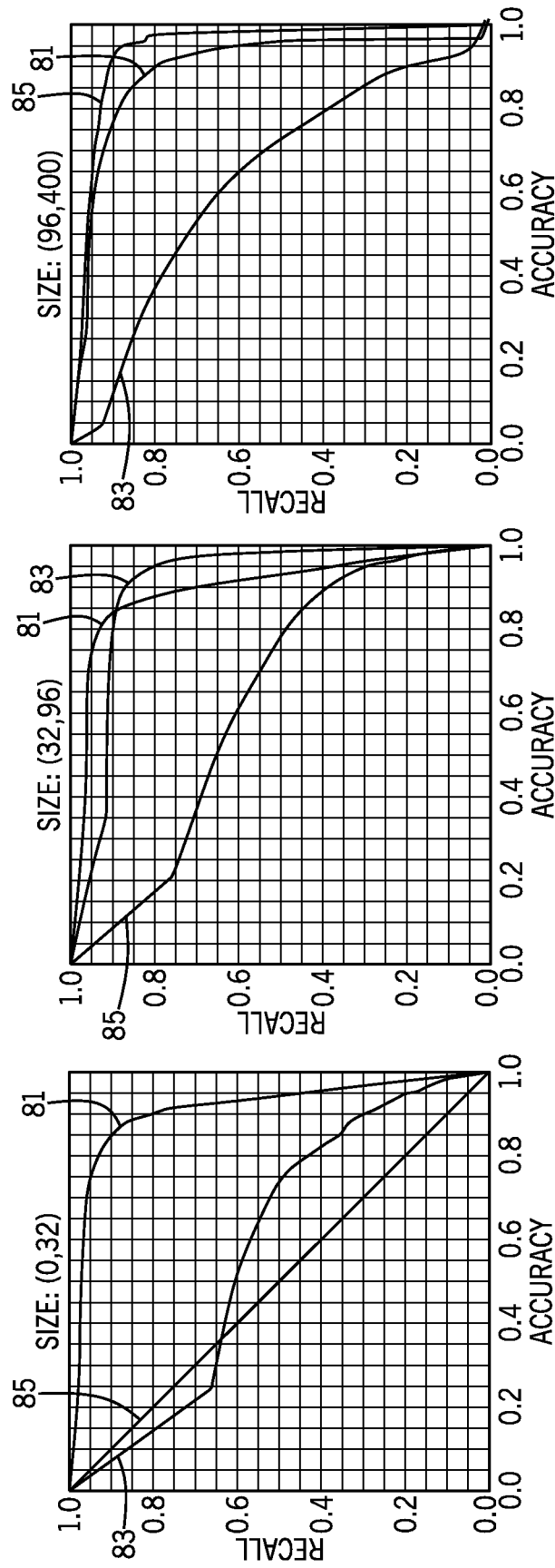
FIGS. 8(a), 8(b) and 8(c) illustrate recall-accuracy curves for small object detection for different image sizes.

The results on the set of traffic signs illustrated by FIG. 6(a)-(c) for detection dataset of the three methods are depicted in FIG. 8. On the image with high resolution, i.e. original image with a resolution of 2048 by 2048, since the network is designed to be sensitive to the small objects, the detection performance on signs with small sizes is the best curve 81 in FIG. 8(a), compared with that for signs with medium and large sizes, i.e. curves 81 curves in FIG. 8(b), and FIG. 8(c). On the image with low resolution, where the originally large signs become detectable by the small object sensitive network, while the originally small signs become invisible to the network, the detection performance for large signs, i.e. curve 85 in FIG. 8(c), becomes superior to that on the images with high or medium resolutions, i.e. curves 85 in FIG. 8(a), and FIG. 8(b).

Some of the signs are well captured in the original image and some of them will become detectable after down-sampling once, as illustrated in FIG. 8(b), curves 81 and 83 both perform reasonably well, since they can predict part of the signs with medium sizes. By combining the results from images with different resolutions, the described embodiments became scale invariant and achieved better performance on signs with different sizes compared with existing techniques.

In this work, a framework for detection small objects from large image is presented. In particular, due to the limited memory available on current GPUs, it is hard for CNNs to process large images, e.g. 2048 pixels by 2048 pixels, and even more difficult to detect small objects from large images. To address the above challenges, the large input image is broken into small patches with fixed size, which are employed as input to an SOS-CNN. Moreover, since objects with large sizes may not be detected in the original resolution, an image pyramid is constructed by down-sampling the original image to make the large objects detectable by the SOS-CNN.

The SOS-CNN may be derived from an SSD model with a VGG-16 network as base network, where only the first 4 convolutional stages of VGG-16 network are kept. A group of default boxes are associated with each location on the feature map to assist the SOS-CNN to produce object detection results. A set of convolutional layers with a kernel size of 3 3 is employed to produce the confidence scores and coordinates of the corresponding bounding box for each of the default boxes. The experimental results on a traffic sign detection datasets, which includes images collected under real world conditions, containing signs occupying only a small proportion of an image, have demonstrated the effectiveness of the proposed method in terms alleviating the memory usage while maintaining a good sign detection performance, especially for signs with small sizes.

The vehicle 124 is configured to collect data such as images in the surroundings of the vehicle 124. A connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the internet.

The sensors array may include one or more sensors configured to detect surroundings of the vehicle. The sensor array may include multiple sensors. Example sensors include an optical distance system such as a LiDAR system, an image capture system such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122.

In some alternatives, additional sensors may be included in the vehicle 124. An engine sensor may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor, may include a steering wheel angle sensor, a speedometer sensor, or a tachometer sensor. The vehicle sensor may include a microphone, an internal camera, or another sensor to detect the internal environment of the vehicle.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated. The assisted driving vehicle may select a route based on any of the examples herein, including road sign indicia.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle and the road indicia from the results of the convolutional neural network analysis.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the road indicia from the results of the convolutional neural network analysis.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle and the road indicia from the results of the convolutional neural network analysis.

The server 125 or the vehicle 124 may calculate a route from an origin to a destination consistent with the road indicia from the results of the convolutional neural network analysis. The origin and/or the destination may be received at the server 125 from the vehicle 124 and the route is calculated from the geographic database 123. Alternatively, the route may be calculated from local database 133. The route includes multiple segments stored in either of the databases. The route may be calculated according to the shortest distance, based on length or distance of the set of road segments, or according the estimated time to traverse the set of road segments. Example routing techniques include the A* algorithm and the Dijkstra algorithm.

Figure 9:
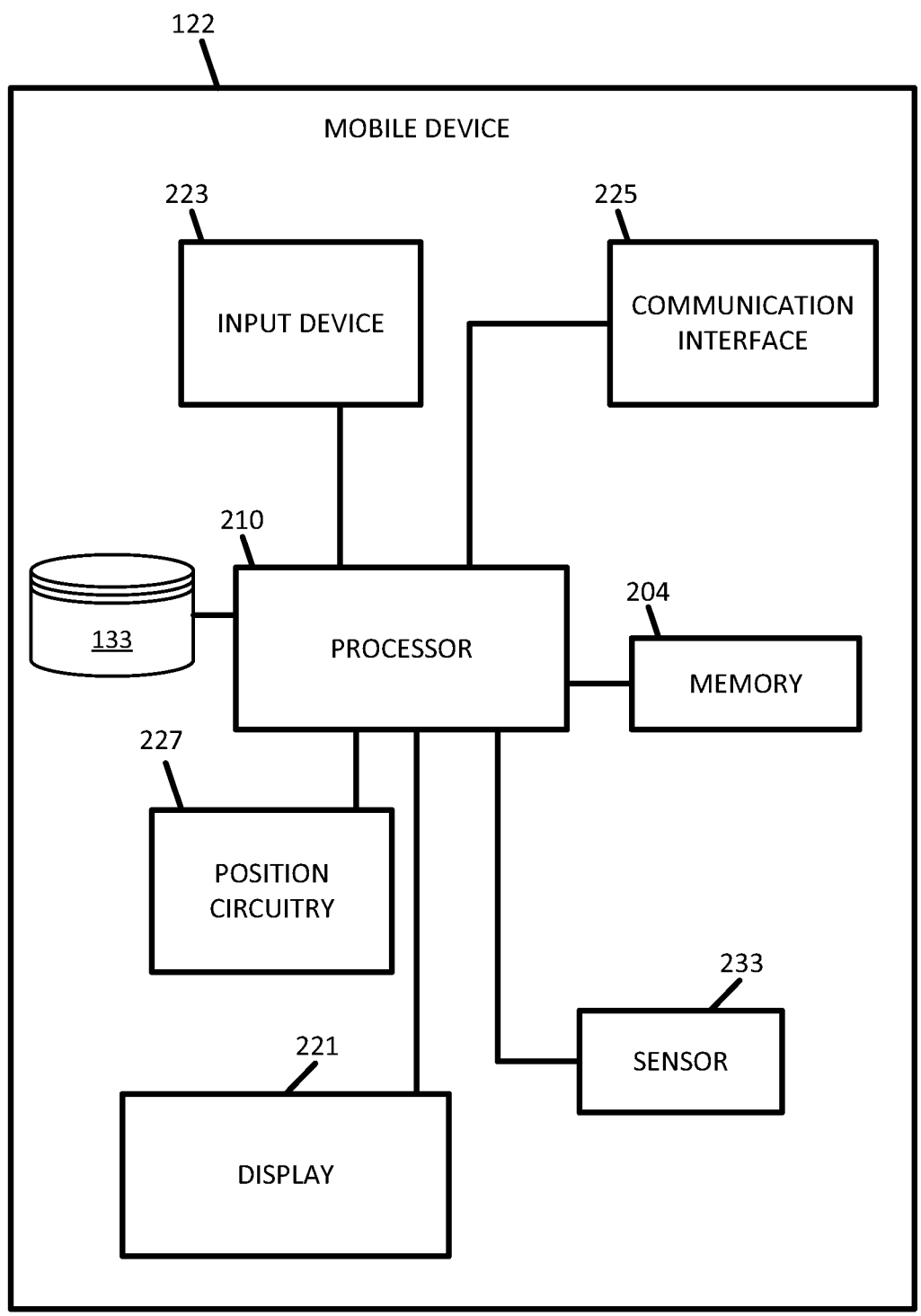
FIG. 9 illustrates an example mobile device.
Figure 10:
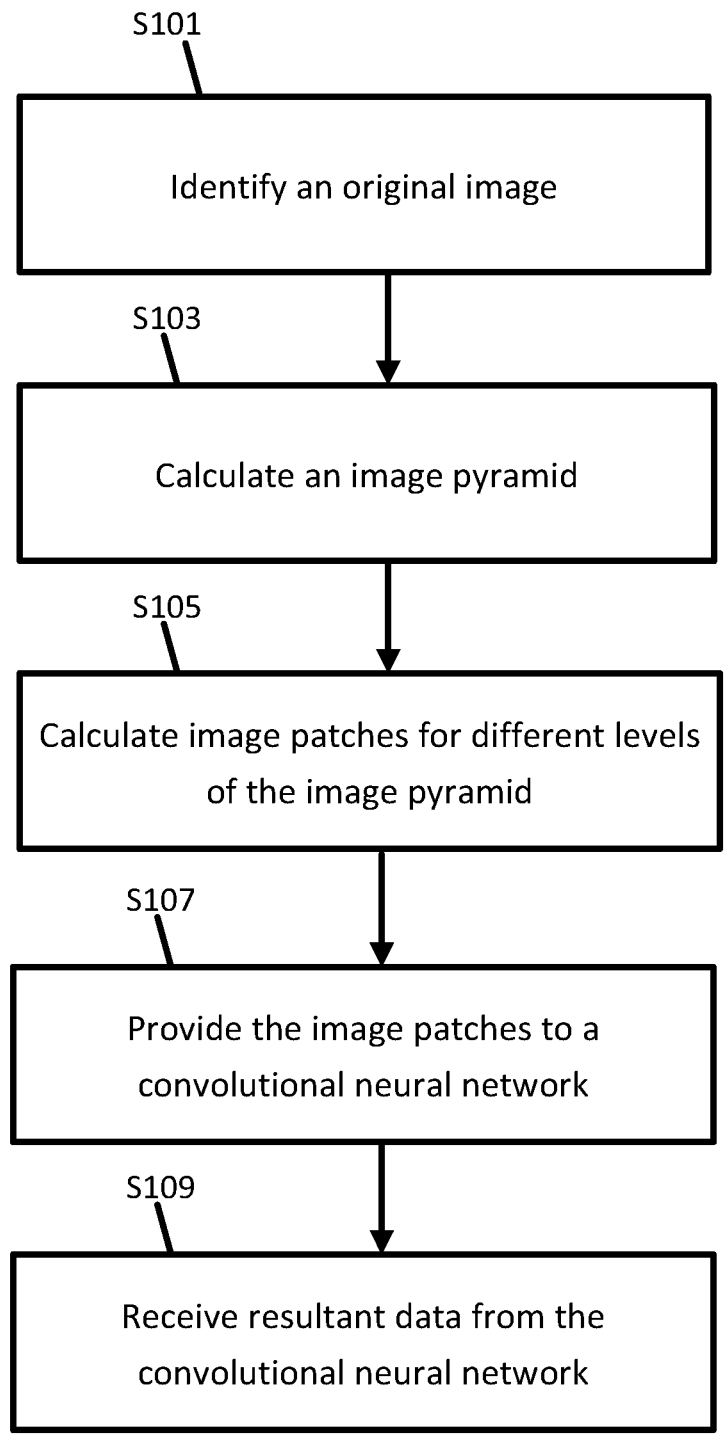
FIG. 10 illustrates an example flowchart for the mobile device of FIG. 9.
Figure 11:
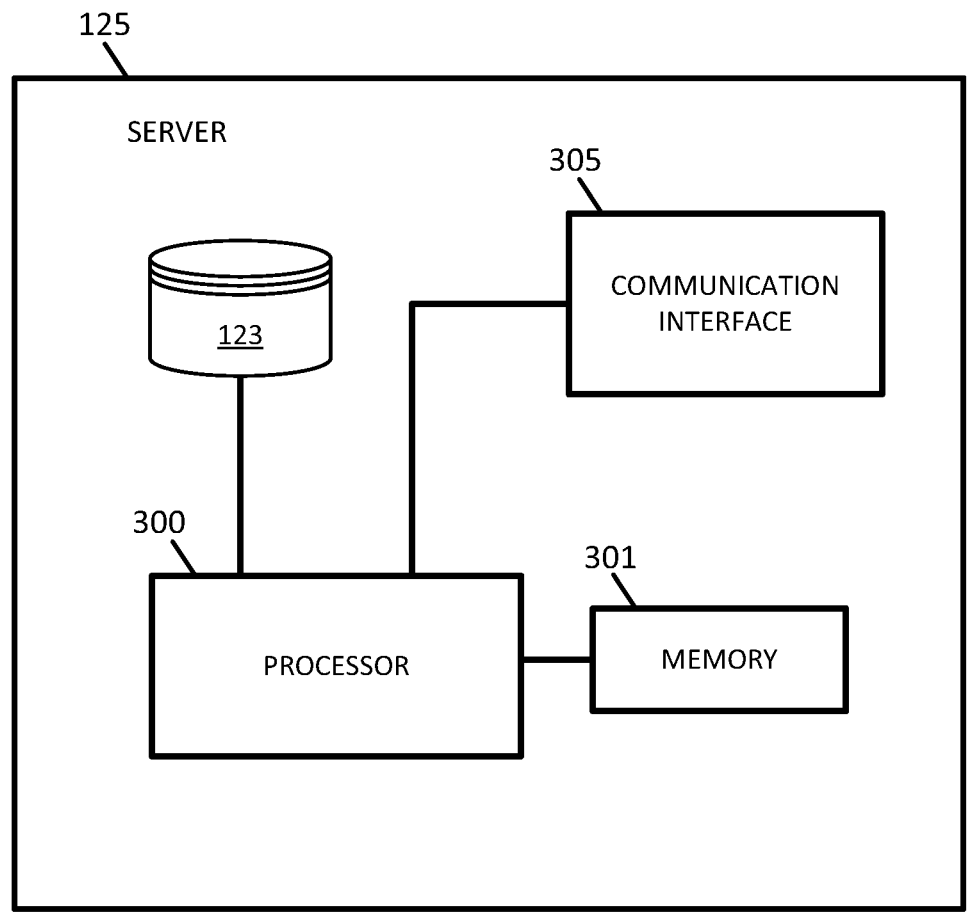
FIG. 11 illustrates an example server.
Figure 12:
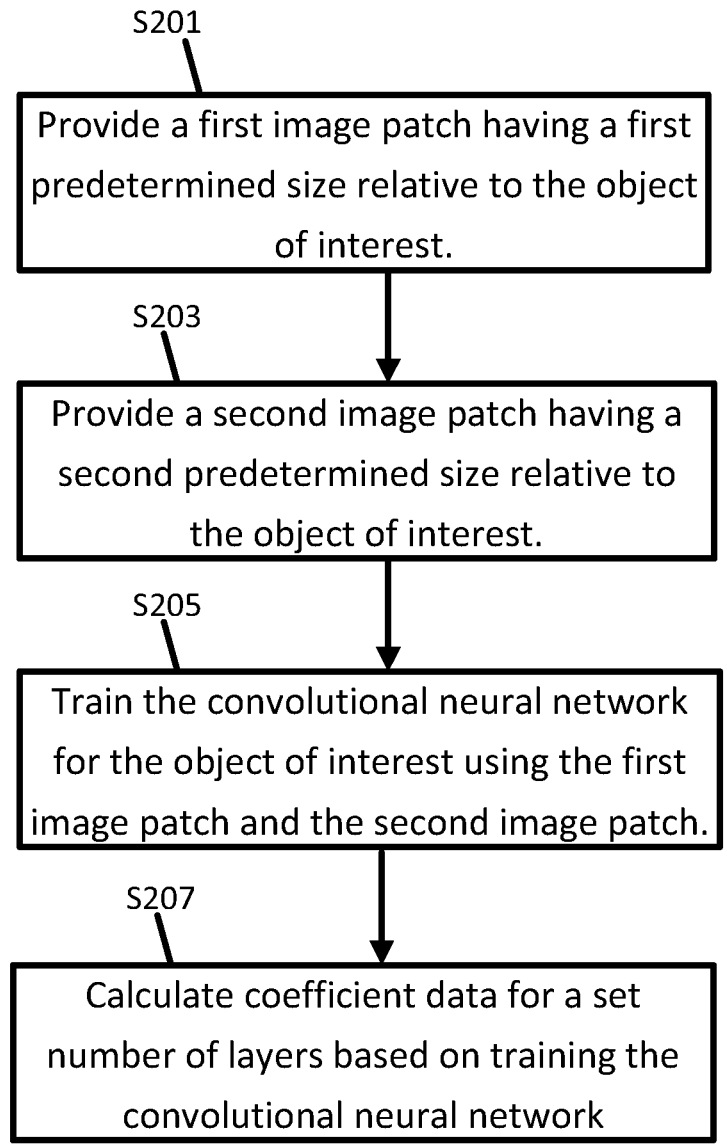
FIG. 12 illustrates an example flowchart for the server of FIG. 11.

FIG. 9 illustrates an exemplary mobile device 122 of the system of FIG. 1. The mobile device 122 includes a processor 210, a local database 133, a memory 204, an input device 223, a communication interface 225, position circuitry 227, a display 221, a sensor 233. The input device 223 may receive entry of road segments, a route, or a destination or waypoints to define a route. Additional, different, or fewer components are possible for the mobile device 122. FIG. 10 illustrates an example flowchart for the mobile device of FIG. 9. Additional, different, or fewer steps may be included.

At act S101, the sensor 233 or the processor 210 identifies an original image including at least one object of interest. The image may be captured using augmented reality. The image may be captured in monitoring the surroundings of a vehicle. The sensor 233 or the processor 210 may be a means for identifying an original image including at least one object of interest. The processor 210 may include circuitry or a module or an application specific controller as a means for identifying an original image including at least one object of interest.

At act S103, the processor 210 calculates an image pyramid from the original image. The image pyramid including a first image under analysis and a second image under analysis. The image pyramid includes the first image under analysis at a first resolution size or image size and the second image under analysis at a second resolution size or image size. The image pyramid may include other images at other resolutions or images sizes. The number of levels or images in the image pyramid may be set by a predetermined number received from the input device 223 or a selected number calculated based on the resolution of the original image and a down-sampling ratio. The processor 210 may include circuitry or a module or an application specific controller as a means for calculating an image pyramid from the original image.

At act S105, the processor 210 calculates images patches for different levels of the image pyramid. The patches may have the same absolute size (e.g. measured in pixels or image size) but have different relative sizes with respect to the first and second image under analysis in the image pyramid. That is, the image patch may overlap a smaller portion or percentage of the first image under analysis than the image overlaps in the second image under analysis. The processor 210 may include circuitry or a module or an application specific controller as a means for calculating images patches for different levels of the image pyramid.

At act S107, the processor 210 provides the image patches to a convolutional neural network. The convolutional neural network has a reduced number of layers. The processor 210 may include circuitry or a module or an application specific controller as a means for providing the image patches to a convolutional neural network.

At act S109, the processor 210, the display 211, or the communication interface 225, receives resultant data from the convolutional neural network. The resultant data for all the image patches may be normalized or scaled to the resolutions or scaling of the original image. The processor 210 may include circuitry or a module or an application specific controller as a means for receiving resultant data from the convolutional neural network. The display 211 may be a means for displaying resultant data from the convolutional neural network. The communication interface 225 may be a means for receiving resultant data from the convolutional neural network.

In one example, the mobile device 122 determines road sign indicia from the resultant data. The mobile device 122 may generate a routing instruction based on the local database 133 and the road sign indicia. The road sign indicia may determine a maneuver (e.g., whether or not a turn is legal, the direction of traffic for a one way road segment). The road sign indicia may determine a speed limit presented with the routing instruction. The road sign indicia may determine whether travel is legal for a vehicle associated with the mobile device 122 (e.g., the road sign indicia may indicate whether trucks are allowed on the road segment or whether bicycles are allowed on the road segment). The routing instructions may be provided by display 221. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments. The mobile device 122 may plan a route through a road system, or modify a current route through a road system according to road attributes derived from the road indicia from the results of the convolutional neural network analysis.

The mobile device 122 may include various types of communication interfaces or communication with the network 127 as the communication network characteristic. The types may include cellular devices (e.g., 3G, 4G, 4G-LTE, 5G or later developed mobile standards), wireless fidelity devices (e.g., IEEE 802.11 family of standards), or another type of device. The mobile device 122 may be configured with access technologies such as WiMAX, 3rd Generation Partnership Project (3GPP) standards, 3GPP2 and WLAN based access architectures. The types of communication may be telephonic, text message, instant message, short message service, or mobile application communication. The 5G may include Edge Computing, which allows very low latency communication, as processing is done at the "edge" of the network, e.g. at the access point. This would allow for data at the mobile device 122 to be collected and distributed quickly among participants in the vicinity of the access point. Vehicles in autonomous mode may communicate with other vehicles nearby through this mechanism.

FIG. 9 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Additional, different, or fewer components may be provided in the server 125. FIG. 10 illustrates an example flowchart for the operation of server 125 in building an occupancy grid. Additional, different, or fewer acts may be provided.

At act S201, the processor 300 provides a first image patch having a first predetermined size relative to the object of interest to a convolutional neural network. The processor 300 may include circuitry or a module or an application specific controller as a means for providing a first image patch having a first predetermined size relative to the object of interest to a convolutional neural network.

At act S203, the processor 300 provides a second image patch having a second predetermined size relative to the object of interest to a convolutional neural network. The processor 300 may include circuitry or a module or an application specific controller as a means for providing a second image patch having a second predetermined size relative to the object of interest to a convolutional neural network.

At act S205, the processor 300 trains the convolutional neural network for the object of interest using the first image patch and the second image patch. The processor 300 may include circuitry or a module or an application specific controller as a means for training the convolutional neural network for the object of interest using the first image patch and the second image patch.

At act S207, the processor 300 calculates coefficient data for a predetermined number of stages based on training the convolutional neural network. The coefficient data for the object of interest is stored in memory 301. The processor 300 may include circuitry or a module or an application specific controller as a means for calculating coefficient data for a predetermined number of layers based on training the convolutional neural network.

Acts S201-S207 may be repeated multiple times as the convolutional neural network is trained and modified over time. Acts S201-S207 may be repeated for each type of image category that is to be analyzed by the convolutional neural network. In one example, the convolutional neural network is trained for a set of road signs used in a geographic area (e.g., for a country, a state, a city or a private area).

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The controller 210 and/or processor 300 may include a general processor, digital signal processor, an application specific integrated circuit (ASIC), field programmable gate array (FPGA), analog circuit, digital circuit, combinations thereof, or other now known or later developed processor. The controller 210 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 225 and/or communication interface 305 may include any operable connection. An operable connection may be one in which signals, physical communications, and/or logical communications may be sent and/or received. An operable connection may include a physical interface, an electrical interface, and/or a data interface. The communication interface 225 and/or communication interface 305 provides for wireless and/or wired communications in any now known or later developed format.

The databases 123 and 133 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 223 may be one or more buttons, keypad, keyboard, mouse, stylus pen, trackball, rocker switch, touch pad, voice recognition circuit, or other device or component for inputting data to the mobile device 122. The input device 223 and display 221 may be combined as a touch screen, which may be capacitive or resistive. The display 221 may be a liquid crystal display (LCD) panel, light emitting diode (LED) screen, thin film transistor screen, or another type of display. The output interface of the display 221 may also include audio capabilities, or speakers.

The positioning circuitry 227 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 227 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 227 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 227 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method comprising:
identifying an original image including at least one object of interest;
calculating an image pyramid from the original image, the image pyramid including a first image under analysis and a second image under analysis;
calculating a first plurality of image patches having a first predetermined size relative to the first image under analysis;
providing the first plurality of image patches to a convolutional neural network;
calculating a second plurality of image patches having a second predetermined size relative to the second image under analysis;
providing the second plurality of image patches to the convolutional neural network;
receiving first resultant data from the convolutional neural network for the first plurality of image patches;
receiving second resultant data from the convolutional neural network for the second plurality of image patches; and
providing the first resultant data and the second resultant data using the original image or the original resolution.

Embodiment 2

The method of embodiment 1, wherein the convolutional neural network reports data from a predetermined number of convolutional stages.

Embodiment 3

The method of embodiment 2, wherein the predetermined number of convolutional stages is four stages.

Embodiment 4

The method of embodiment 2, further comprising:
discarding data from the convolutional neural network after the predetermined number of convolutional stages.

Embodiment 5

The method of embodiment 1, further comprising:
disabling one or more subsequent convolutional stages after the predetermined number of convolutional stages.

Embodiment 6

The method of embodiment 1, wherein providing the first resultant data and the second resultant data using the original image comprises displaying the first resultant data and the second resultant data on a feature map.

Embodiment 7

The method of embodiment 1, further comprising:
converting the first resultant data to a resolution of the original image;
converting the second resultant data to the resolution of the original image; and
combining the converted first resultant data and the converted second resultant data.

Embodiment 8

The method of embodiment 1, wherein the first resultant data or the second resultant data includes a category for the at least one object of interest.

Embodiment 9

The method of embodiment 1, wherein the first resultant data or the second resultant data includes an image location for the at least one object of interest.

Embodiment 10

The method of embodiment 1, wherein the at least one object of interest includes a road sign including road sign indicia, the first resultant data indicative of the road sign indicia.

Embodiment 11

A method comprising:
identifying an original image at an original resolution and including at least one object of interest, wherein the original image is ground truth for the object of interest;
calculating a first image patch having a first predetermined size relative to the object of interest and including the object of interest;
providing the first image patch to a convolutional neural network;
calculating a second image patch having a second predetermined size relative to the object of interest and including the object of interest;
providing the second image patch to the convolutional neural network;
training the convolutional neural network for the object of interest using the first image patch and the second image patch;
calculating coefficient data for a predetermined number of stages based on training the convolutional neural network; and
storing the coefficient data for the object of interest.

Embodiment 12

The method of embodiment 11, wherein the convolutional neural network is trained only for a predetermined number of convolutional stages.

Embodiment 13

The method of embodiment 12, wherein the predetermined number of convolutional stages is four stages.

Embodiment 14

The method of embodiment 12, wherein the original image is associated with metadata for a category for the at least one object of interest and the coefficient data for the object of interest is associated with the category for the object of interest.

Embodiment 15

The method of embodiment 11, further comprising:
calculating an image pyramid from the original image, the image pyramid including a first image under analysis and a second image under analysis.

Embodiment 16

The method of embodiment 15, wherein the first image patch is associated with the first image under analysis and the second image patch is associated with the second image under analysis.

Embodiment 17

The method of embodiment 11, wherein the at least one object of interest includes a road sign including road sign indicia, the coefficient data corresponding to the road sign indicia.

Embodiment 18

An apparatus comprising at least one processor and at least one memory including computer program code; the at least one memory and the computer program code configured to, with the at least one processor, cause the apparatus to at least perform:
identify an original image including at least one object of interest;
calculate an image pyramid from the original image, the image pyramid including a first image under analysis and a second image under analysis;
calculate a first plurality of image patches having a first predetermined size relative to the first image under analysis;
provide the first plurality of image patches to a convolutional neural network;
calculate a second plurality of image patches having a second predetermined size relative to the second image under analysis;
provide the second plurality of image patches to the convolutional neural network;

receive first resultant data from the convolutional neural network for the first plurality of image patches;

receive second resultant data from the convolutional neural network for the second plurality of image patches; and provide the first resultant data and the second resultant data using the original image or the original resolution.

Embodiment 19

The apparatus of embodiment 18, wherein the convolutional neural network reports data from a predetermined number of convolutional stages.

Embodiment 20

An apparatus comprising at least one processor and at least one memory including computer program code; the at least one memory and the computer program code configured to, with the at least one processor, cause the apparatus to at least perform:
identify an original image at an original resolution and including at least one object of interest, wherein the original image is ground truth for the object of interest;
calculate a first image patch having a first predetermined size relative to the object of interest and including the object of interest;
provide the first image patch to a convolutional neural network;
calculate a second image patch having a second predetermined size relative to the object of interest and including the object of interest;
provide the second image patch to the convolutional neural network;
train the convolutional neural network for the object of interest using the first image patch and the second image patch;
calculate coefficient data for a predetermined number of stages based on training the convolutional neural network; and
store the coefficient data for the object of interest.

We claim:

1. A method comprising:
identifying an original image including at least one object of interest;
calculating an image pyramid from the original image, the image pyramid including a first image under analysis and a second image under analysis;
calculating a first plurality of image patches using a sliding window technique, the first plurality of image patches having a first predetermined size relative to the first image under analysis;
providing the first plurality of image patches to a convolutional neural network;
calculating a second plurality of image patches using the sliding window technique, the second plurality of image patches having a second predetermined size relative to the second image under analysis;
providing the second plurality of image patches to the convolutional neural network;
receiving first resultant data from the convolutional neural network for the first plurality of image patches;
receiving second resultant data from the convolutional neural network for the second plurality of image patches;
converting the first resultant data to an original resolution of the original image;

converting the second resultant data to the original resolution of the original image; and combining the first resultant data converted to the original resolution and the second resultant data converted to the original resolution in a single feature map.

2. The method of claim 1, wherein the convolutional neural network reports data from a predetermined number of convolutional stages.

3. The method of claim 2, wherein the predetermined number of convolutional stages is four stages.

4. The method of claim 2, further comprising:
discarding data from the convolutional neural network after the predetermined number of convolutional stages.

5. The method of claim 2, further comprising:
disabling one or more subsequent convolutional stages after the predetermined number of convolutional stages.

6. The method of claim 1, wherein the first resultant data or the second resultant data includes a category for the at least one object of interest.

7. The method of claim 1, wherein the first resultant data or the second resultant data includes an image location for the at least one object of interest.

8. The method of claim 1, wherein the at least one object of interest includes a road sign including road sign indicia, the first resultant data indicative of the road sign indicia.

9. The method of claim 1, further comprising:
disabling at least one stage of the convolutional neural network.

10. The method of claim 9, wherein the convolutional neural network is trained only for a predetermined number of convolutional stages.

11. The method of claim 10, wherein the predetermined number of convolutional stages is four stages.

12. The method of claim 10, wherein the original image is associated with metadata for a category for the at least one object of interest and the coefficient data for the object of interest is associated with the category for the object of interest.

13. The method of claim 9, wherein the at least one object of interest includes a road sign including road sign indicia.

14. An apparatus comprising at least one processor and at least one memory including computer program code; the at least one memory and the computer program code configured to, with the at least one processor, cause the apparatus to at least perform:
identify an original image including at least one object of interest;
calculate an image pyramid from the original image, the image pyramid including a first image under analysis and a second image under analysis;
sliding a window across the first image under analysis for a first plurality of image patches having a first predetermined size relative to the first image under analysis;
provide the first plurality of image patches to a first convolutional neural network;
sliding a window across the second image under analysis for a second plurality of image patches having a second predetermined size relative to the second image under analysis;
provide the second plurality of image patches to a second convolutional neural network;
receive first resultant data from the first convolutional neural network for the first plurality of image patches;

receive second resultant data from the second convolutional neural network for the second plurality of image patches;

convert the first resultant data to an original resolution of the original image;

convert the second resultant data to the original resolution of the original image; and combine the first resultant data from the first convolutional neural network converted to the original resolution and the second resultant data from the second convolutional neural network converted to the original resolution in a single feature map.

15. The apparatus of claim 14, wherein the convolutional neural network reports data from a predetermined number of convolutional stages.

16. The apparatus of claim 15, the at least one memory and the computer program code configured to, with the at least one processor, cause the apparatus to at least perform:

disable at least one of the predetermined number of convolutional stages of the convolutional neural network.

17. A non-transitory computer readable medium including instructions that when executed by a processor are configured to perform:

identifying an original image including at least one object of interest;

calculating an image pyramid from the original image, the image pyramid including a first image under analysis and a second image under analysis;

calculating a first plurality of image patches using a sliding window technique, the first plurality of image patches having a first predetermined size relative to the first image under analysis;

providing the first plurality of image patches to a convolutional neural network;

calculating a second plurality of image patches using the sliding window technique, the second plurality of image patches having a second predetermined size relative to the second image under analysis;

providing the second plurality of image patches to the convolutional neural network;

receiving first resultant data from the convolutional neural network for the first plurality of image patches;

receiving second resultant data from the convolutional neural network for the second plurality of image patches;

converting the first resultant data to an original resolution of the original image;

converting the second resultant data to the original resolution of the original image; and combining the first resultant data converted to the original resolution and the second resultant data converted to the original resolution in a single feature map.

* * * * *